Nov. 12, 1963 J. F. PANICELLO 3,110,820

FREQUENCY DIVIDER EMPLOYING A DEVICE OPERATED TO PROVIDE A DYNAMIC INPUT VERSUS OUTPUT SIGNAL TRANSFER CHARACTERISTIC OF AN EXPONENTIAL NATURE

Filed Oct. 12, 1960

INVENTOR
BY J. F. PANICELLO
H. L. Logan
ATTORNEY

United States Patent Office 3,110,820 Patented Nov. 12, 1963

3,110,820

FREQUENCY DIVIDER EMPLOYING A DEVICE OPERATED TO PROVIDE A DYNAMIC INPUT VERSUS OUTPUT SIGNAL TRANSFER CHARACTERISTIC OF AN EXPONENTIAL NATURE

Joseph F. Panicello, Dover, N.J., assignor to Bell Telephone Laboratories, Incorporated, New York, N.Y., a corporation of New York Filed Oct. 12, 1960, Ser. No. 62,146
7 Claims. (Cl. 307—88.5)

This invention relates to frequency dividers and in particular to frequency dividers of the regenerative modulation type.

Various frequency dividers of the regenerative modulation type are disclosed in the prior art. A full discussion of this type of divider is found, for example, in United States Patent 2,159,595 issued to R. L. Miller on May 23, 1939. Basically, such a divider may comprise a balanced modulator to modulate a signal to be frequency divided with a second signal obtained from within the divider, a filter network to pass only the lower side-band signal in the modulator output, an amplifier to amplify the lower side-band signal and a frequency multiplier to frequency multiply the amplified lower side-band signal which in turn is applied to the modulator as the second signal. As in the case of oscillators, circuit noise and transients produced when the divider is first energized produce the necessary internal signals to start the divider operating. The output of the divider is the lower side-band signal whose frequency is a submultiple of the frequency to be divided.

The relationship between the various elements of the above-described divider to produce a particular dividing rate is discussed subsequently with respect to the drawings. As will become apparent, it is necessary when changing the dividing rate of a divider of this type to provide a filter of a different pass band and a frequency multiplier with a different multiplication factor. Although this may not be objectionable in many applications, it is sometimes desirable to be able to change the dividing rate more easily.

An object of the present invention is to produce frequency division by regenerative modulation without the use of filter networks and frequency multipliers that must be changed each time it is desired to change the dividing rate.

This and other objects of the present invention are achieved by taking advantage of a phenomenon that occurs when a pulse train is applied to an amplifying device having a dynamic input versus output signal transfer characteristic of an exponential nature. In particular, it has been found that the envelope of the maximum amplitudes of the harmonics of the output pulse train produced by such a device has the form of a decreasing cosine wave. Furthermore, it has been found that by controlling the exponential nature of the transfer characteristic that the maximum amplitudes of the harmonics may be made to change with respect to one another so as to cause their envelope to either expand or contract. When, for example, a 10 pulse per second pulse train is applied to a transistor having a particular bias so as to be driven into saturation, the maximums in the sinusoidal envelope of the output harmonic amplitudes occur at 40, 80, 120, 160, et cetera, cycles per second. With another bias setting which also causes the transistor to be driven into saturation, the maximums in the sinusoidal envelope occur at 50, 100, 150, et cetera, cycles per second. Other bias settings cause the amplitude maximums to occur at other but similar frequency combinations.

In one of the broader aspects of the present invention, a device of the above-described nature is used in a regenerative modulation type of frequency divider to perform all of the functions of the filter, the amplifier and the frequency multiplier of the previously described prior art. In accordance with one feature of the invention, the dividing rate is easily changed by merely controlling the exponential nature of the device's transfer characteristic instead of having to change circuit components. Furthermore, in accordance with another feature of the invention, frequency dividers may be constructed which require fewer components, may be made more compact and may be lighter in weight than those found in the prior art.

In one embodiment of the invention a balanced modulator is used to modulate sinusoidal input signals with pulses obtained from within the circuit. The output from the modulator is also in the form of pulses and is applied to the base of a transistor biased so that the pulses cause the transistor to saturate. The output from the transistor, which also is in the form of pulses, is used as both the output signal from the embodiment and also the pulse input to the modulator. A variable biasing arrangement is provided for controlling the bias on the transistor, which controls the dividing rate of the embodiment.

Other objects and features of the invention will become apparent from a study of the following detailed description of a specific embodiment of the invention.

Figure 1:
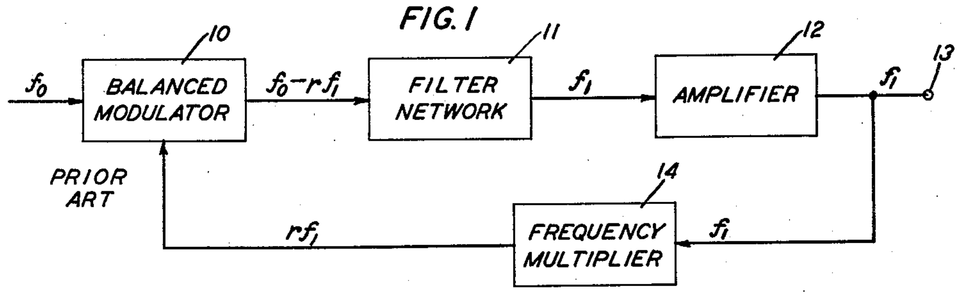
FIG. 1 is a block diagram of a regenerative modulation type of frequency divider found in the prior art.

The prior art regenerative modulation divider shown in block diagram form in FIG. 1 is fully described in the previously referred to patent issued to R. L. Miller. Briefly, this arrangement includes a balanced modulator 10, the output of which is applied to a filter network 11 whose output in turn is applied to an amplifier 12. The output from amplifier 12 is applied to both an output terminal 13 and a frequency multiplier 14. The output from frequency multiplier 14 is applied to one of the inputs of balanced modulator 10 while the signal to be divided, which is at a frequency $f_0$, is applied to the other input of modulator 10.

Circuit noise and other transients produced when the divider of FIG. 1 is first energized produce the necessary signals within the circuit to start the circuit operating. When operating the output from frequency multiplier 14 is at a frequency $rf_1$ and modulator 10 produces, among other signals, a lower side-band signal at a frequency $f_0-rf_1$. Filter network 11 is designed to pass only this signal which in turn is amplified by amplifier 12 and frequency multiplied by a factor $r$ by multiplier 14. For the circuit to operate, it is believed to be obvious that $f_0-rf_1$ must equal $f_1$ and that the dividing rate of the arrangement is equal to $r+1$. In order to cause the divider to operate at a different dividing rate it is therefore necessary that filter network 11 be changed to pass signals at the desired output frequency and that frequency multiplier 14 be changed in order to provide the necessary multiplication factor to produce the desired dividing rate.

Figure 2:
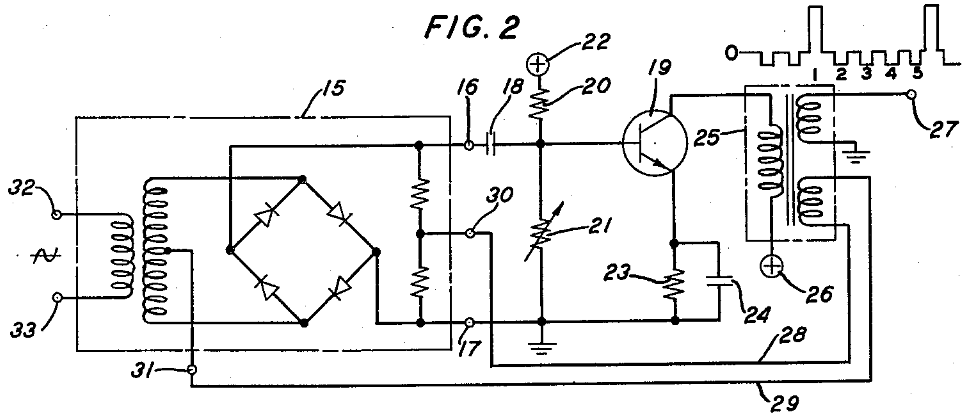
FIG. 2 is a schematic diagram of a particular embodiment of the present invention.

In the embodiment of the present invention illustrated in FIG. 2, the output of a conventional balanced modulator 15 appears at a pair of terminals 16 and 17. Terminal 16 is connected by way of a capacitor 18 to the base electrode of a transistor 19 while terminal 17 is connected to a point of ground potential. A biasing arrangement comprising serially connected fixed resistor 20 and variable resistor 21 is connected between a source of potential 22 and the point of ground potential with the junction between the serially connected resistors 20 and 21 connected to the base electrode of transistor 19. Further biasing is achieved in a conventional manner as a result of a resistor 23 connected between the emitter electrode of transistor 19 and the point of ground potential. Both of these biasing arrangements determine the base-to-emitter bias of transistor 19. An alternating current bypass capacitor 24 is connected in parallel with resistor 23. The collector of transistor 19 is connected by way of the primary winding of a transformer 25 to a source of potential 26. Transformer 25 includes a pair of secondary windings. One of these secondary windings is connected between an output terminal 27 and the point of ground potential while the other secondary is connected by a pair of leads 28 and 29 to a pair of input terminals 30 and 31 of modulator 15. The sinusoidal input wave to be frequency divided is applied between the other input terminals 32 and 33 of the modulator 15.

As in the prior art frequency divider of FIG. 1, the embodiment of the invention shown in FIG. 2 starts to operate as a result of circuit noise and transients produced when the circuit is first energized. When operating, the embodiment of FIG. 1 feeds back to modulator 15 a pulse train of predominantly positive-going pulses having a repetition rate of $f_1$. All of the harmonics of the fedback pulse train combine in modulator 15 with the sinusoidal signal to be divided. The output from modulator 15 is a pulse train of predominantly negative-going pulses at a repetition rate of $f_1$. The nonlinear operation of transistor 19 is believed to rearrange the harmonic content of this negative-going pulse train to produce the harmonic content in the positive-going pulse train necessary to combine with the sinusoidal signal to produce the negative-going pulse train. The following paragraph contains a more detailed explanation of what is believed to take place in transistor 19. Adjacent to output terminal 27 is a sketch representing the output produced when the sinusoidal input signal is divided by five. This sketch shows a repetitive pattern of a positive-going pulse and then four relatively small amplitude negative-going pulses. The positive-going pulses occur at five-cycle intervals of the sinusoidal input signal while a negative-going pulse occurs for each of the remaining cycles. The positive-going pulse train therefore has a repetition rate equal to one-fifth of the frequency of the sinusoidal input signal.

Figure 3:
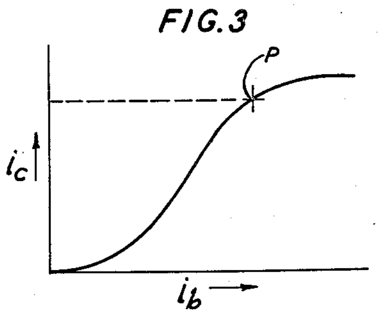
FIG. 3 is a curve illustrating one of the characteristics of a transistor appearing in the embodiment illustrated in FIG. 2.

The following discussion relates to what is believed to take place in transistor 19. FIG. 3 shows the typical $i_c$ versus $i_b$ characteristic of a transistor. Because the upper portion of this curve is nonlinear the expression for the collector current when the transistor is driven into saturation may be expressed as follows:

$$i_c=I_c[1+m(1-e^{-ki_{sb}})] \qquad (1)$$

where $k$ is a constant depending on the location of the quiescent point P on the curve and $i_{sb}$ is the signal current $I_{sb}$ cos $2\pi ft$ at the base. Assuming $f$ to be continuous, Equation 1 may be expanded and solved for a maximum and minimum to produce the following expression:

$$f=\frac{1}{2\pi t}\cos^{-1}\frac{1}{I_{sb}k} \qquad (2)$$

Figure 4:
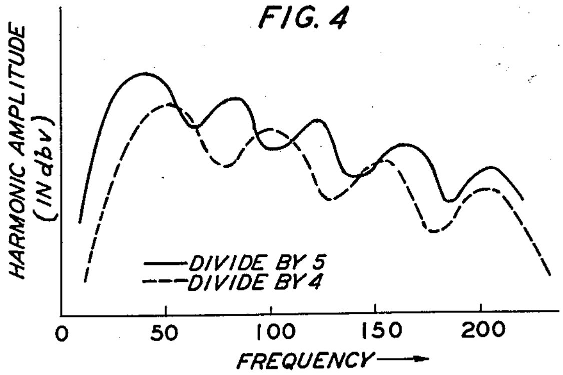
FIG. 4 shows the envelopes of several response curves obtained during the course of investigating the embodiment of FIG. 2.

This expression indicates that the maximum values of the harmonics of the collector current are not only not equal but have an envelope which varies as a cosine function. Furthermore, this expression indicates that the frequencies at which the maximum harmonic currents occur vary as a function of the drive signal and the position of the point P on the curve. This theory was tested in the laboratory by disconnecting capacitor 18 from terminal 16 and applying a 10 pulse per second negative-going pulse train to the base of transistor 19 in FIG. 2. This pulse train had a harmonic content up to at least 250 cycles per second. For the bias setting on transistor 19 which causes the divider to divide by a factor of five, the maximum currents of the harmonics in the output pulses appearing in the collector circuit of transistor 19 had an envelope similar to that shown in the solid line curve of FIG. 4. The cosine variation in the envelope of the maximum amplitudes of the harmonic currents is readily seen in this figure. Furthermore, it will be noted that the peaks occur at 40 cycle intervals. The bias on transistor 19 was readjusted so that in normal operation the circuit divided by four and the 10 pulse per second pulse train was again applied in the manner described above. The maximum amplitudes of the harmonic currents appearing in the output pulses had an envelope similar to that shown by the broken curve of FIG. 4. It will be noted that the maximum amplitudes occur at 50 cycle intervals. These tests appear to experimentally verify the above-described theory that the nonlinear operation of transistor 19 rearranges the harmonic content and that with a constant input level signal the rearrangement of the harmonic content is a function of the quiescent operating point of the transistor.

To further verify the above theory of operation, tests were performed to eliminate the possibility that the frequency dividing action is dependent on one or more of the reactive elements found in the embodiment of FIG. 2. Capacitors 18 and 25 were individually increased by a factor of approximately forty with the only noticeable change being that the circuit required several minutes to start operating as a result of the length of time required to charge the larger capacitors. Once charged, however, the circuit operated in a manner identical to that prior to the change. No change in the dividing rate occurred when an inductor having an inductance equal to twice the inductance of the primary winding of transformer 26 was connected in series with the primary winding. Furthermore, no changes occurred when transformers having substantially the same turns-ratio but different inductance and distributed capacitance characteristics were substituted for transformer 26. The dividing action therefore does not appear to be dependent on any of the reactive elements.

Embodiments of the present invention have a high degree of stability as small changes in the level where transistor saturation occurs does not change the dividing factor because of the regeneration action. Small changes in supply voltage, temperature or input signal level do not, therefore, affect the dividing rate.

The embodiment of the invention shown in FIG. 2 has been described with the quiescent point P in the upper portion of the curve shown in FIG. 3. It has been found that frequency division may also be accomplished by operating the circuit so that the quiescent point P resides in the lower nonlinear portion of the curve; that is, closer to the point of cut-off.

While the invention has been described with respect to a specific embodiment, it will be evident to those skilled in the art that various modifications may be made without departing from the spirit and scope of the invention.

What is claimed is:

1. In combination means for modulating an input signal with a first plurality of signals to produce a second plurality of signals, amplifying means having an input circuit, an output circuit and a dynamic input signal versus output signal transfer characteristic of an exponential nature, means for controlling said exponential nature of said transfer characteristic, means for applying said second plurality of signals to said amplifying means input circuit, and means for applying the output from said amplifying means to said modulator as said first plurality of signals.

2. A combination in accordance with claim 1 wherein said amplifying means comprises a transistor.

3. A combination in accordance with claim 2 wherein said controlling means comprises a biasing circuit.

4. In combination a modulator having a pair of input circuits and an output circuit, amplifying means having an input circuit, an output circuit and a dynamic input signal versus output signal transfer characteristic of an exponential nature, means for controlling said exponential nature of said transfer characteristic, means for connecting said modulator output circuit to said amplifying means input circuit to apply substantially all of the signals in the output of said modulator to said amplifying means, and means for connecting said amplifying means output circuit to one of said modulator input circuits to apply substantially all of the signals in the output of said amplifying means to said modulator.

5. A combination in accordance with claim 4 wherein said amplifying means comprises a transistor.

6. A combination in accordance with claim 5 wherein said controlling means comprises a biasing circuit.

7. A frequency divider comprising a balanced modulator having a pair of input circuits and an output circuit, a transistor having base, emitter and collector electrodes, means for applying substantially all of the signals appearing in said modulator output circuit between said base and emitter electrodes, means for controlling the base-to-emitter bias of said transistor so that said signals appearing in said modulator output circuit cause said transistor to saturate, a transformer having a primary winding and at least one secondary winding, a source of potential connected in series with said primary winding for reverse biasing the collector-to-base junction of said transistor, and means for connecting one of said secondary windings to one of said modulator input circuits to apply substantially all of the signals from said transistor to said modulator.

References Cited in the file of this patent

UNITED STATES PATENTS 2,159,595 Miller ---------------- May 23, 1939